United States Patent [19]

Zimny et al.

[11] Patent Number: 5,722,531

[45] Date of Patent: Mar. 3, 1998

[54] BELT TURN CONVEYOR

[75] Inventors: Mariusz Zimny, Brampton; John Krznarich, Etobicoke; Allan Ewing, Georgetown, all of Canada

[73] Assignee: Mannesmann Dematic Rapistan Corp., Grand Rapids, Mich.

[21] Appl. No.: 600,593

[22] Filed: Feb. 13, 1996

[51] Int. Cl.⁶ .................................................. B65G 21/16
[52] U.S. Cl. ........................................ 198/831; 198/861.1
[58] Field of Search .............................. 198/831, 860.1, 198/861.1

[56] References Cited

U.S. PATENT DOCUMENTS

| | | |
|---|---|---|
| 735,722 | 8/1903 | Dennis . |
| 1,578,303 | 3/1926 | Walter et al. . |
| 1,698,786 | 1/1929 | Finn ............................ 198/831 X |
| 1,972,753 | 9/1934 | Bausman . |
| 2,320,667 | 6/1943 | Smith . |
| 2,619,222 | 11/1952 | Przybylski . |
| 2,725,757 | 12/1955 | Murphy . |
| 3,214,007 | 10/1965 | Matthies et al. . |
| 3,217,861 | 11/1965 | Daniluk et al. . |
| 3,237,754 | 3/1966 | Freitag, Jr. et al. . |
| 3,661,244 | 5/1972 | Koyama . |
| 3,901,379 | 8/1975 | Bruhm . |
| 4,203,512 | 5/1980 | Ammeraal . |
| 4,724,953 | 2/1988 | Winchester . |
| 4,846,338 | 7/1989 | Widmer . |
| 4,955,466 | 9/1990 | Almes et al. . |
| 5,056,655 | 10/1991 | Justice ............................ 198/303 X |
| 5,299,674 | 4/1994 | Lusitar ............................ 198/303 |
| 5,332,082 | 7/1994 | Sommerfield . |
| 5,360,102 | 11/1994 | Schöning . |

FOREIGN PATENT DOCUMENTS

| | | |
|---|---|---|
| 464877A | 1/1992 | European Pat. Off. . |
| 4020226 | 1/1992 | Germany ............................ 198/831 |
| 4113051 | 4/1995 | Germany . |
| 8700593 | 10/1988 | Netherlands . |
| WO942785 | 12/1994 | WIPO . |

*Primary Examiner*—James R. Bidwell
*Attorney, Agent, or Firm*—Van Dyke, Gardner, Linn & Burkhart, LLP

[57] ABSTRACT

A belt turn conveyor includes a vertical support member extending to the ground and a lateral support which is cantilevered from the vertical support. An endless belt can be removed and installed by slipping the endless belt over an end of the lateral support opposite the vertical support. In this manner, the belt can be removed without disassembling the vertical support.

30 Claims, 8 Drawing Sheets

BELT TURN CONVEYOR

BACKGROUND OF THE INVENTION

This invention relates generally to belt conveyors and, more particularly, to belt turn conveyors which extend around a curve.

Belt turn conveyors are capable of interconnecting conveyor sections through a turn of up to 180°. Such conveyor section includes a pair of pulleys, one at each end, and a continuous belt having a smaller length at the inner radius of the turn and increasing in length toward the outer radius of the turn. A planar support surface supports the upper surface of the belt which slides across the support surface. Means are provided to resist radial forces tending to pull the belt inward of the turn. These typically include wheels mounted to the belt engaging a surface on a stationary frame or wheels molted to a stationary frame engaging a lip on the belt.

Known belt turn conveyors tend to have a poor utilization rate because maintenance is difficult and time-consuming when required. This is especially the case with replacement of the belt which has required disassembly of virtually the entire conveyor section. Additionally, difficult alignment procedures have added to the downtime of the conveyor undergoing maintenance or installation.

SUMMARY OF THE INVENTION

The present invention provides a belt turn conveyor that is exceptionally easy to maintain. In particular, the replacement of the belt is a quick and simple procedure requiring disassembly of, at most, only minor portions of the conveyor.

A belt turn conveyor, according to the invention, includes a vertical support. A lateral support is provided that is cantilevered from the vertical support. An endless belt rides on the lateral support. In this manner, the belt can be removed from or installed on the conveyor without disassembling the vertical support by slipping the endless belt over an end of the lateral support opposite the vertical support.

According to another aspect of the invention, the lateral support is mounted by a rigid bracket having a central support portion. Preferably, the bracket is formed in either a T-shape or an E-shape but other shapes are possible. Wheel guide surfaces are mounted to the bracket in order to engage wheels mounted to the belt. In this manner, the belt may be readily removed by removing the guide surfaces from the bracket. Additionally, the bracket provides rigid cantilever support for the lateral support.

The lateral support, according to another aspect of the invention, is formed as a truss. Preferably, the truss is made up of a planar bed which extends below the upper surface of the belt including at least one laterally extending member spaced below the top bed surface and interconnected therewith by a vertical strut. This truss configuration provides a rigid lateral support that is capable of cantilever mounting.

According to another aspect of the invention, an elongated drive pulley rotates about a first axis in order to frictionally engage the belt to thereby drive the belt. A motor assembly rotates about a second axis for rotating the drive pulley. The first and second axes are maintained in parallel configuration by a beveled spacer. The beveled spacer provides alignment notwithstanding the compound angles required by the tapered drive pulley without requiring adjustment devices.

These and other objects, advantages, and features of this invention will become apparent upon review of the following specification in conjunction with the drawings.

DESCRIPTION OF THE PREFERRED EMBODIMENT

Figure 1:
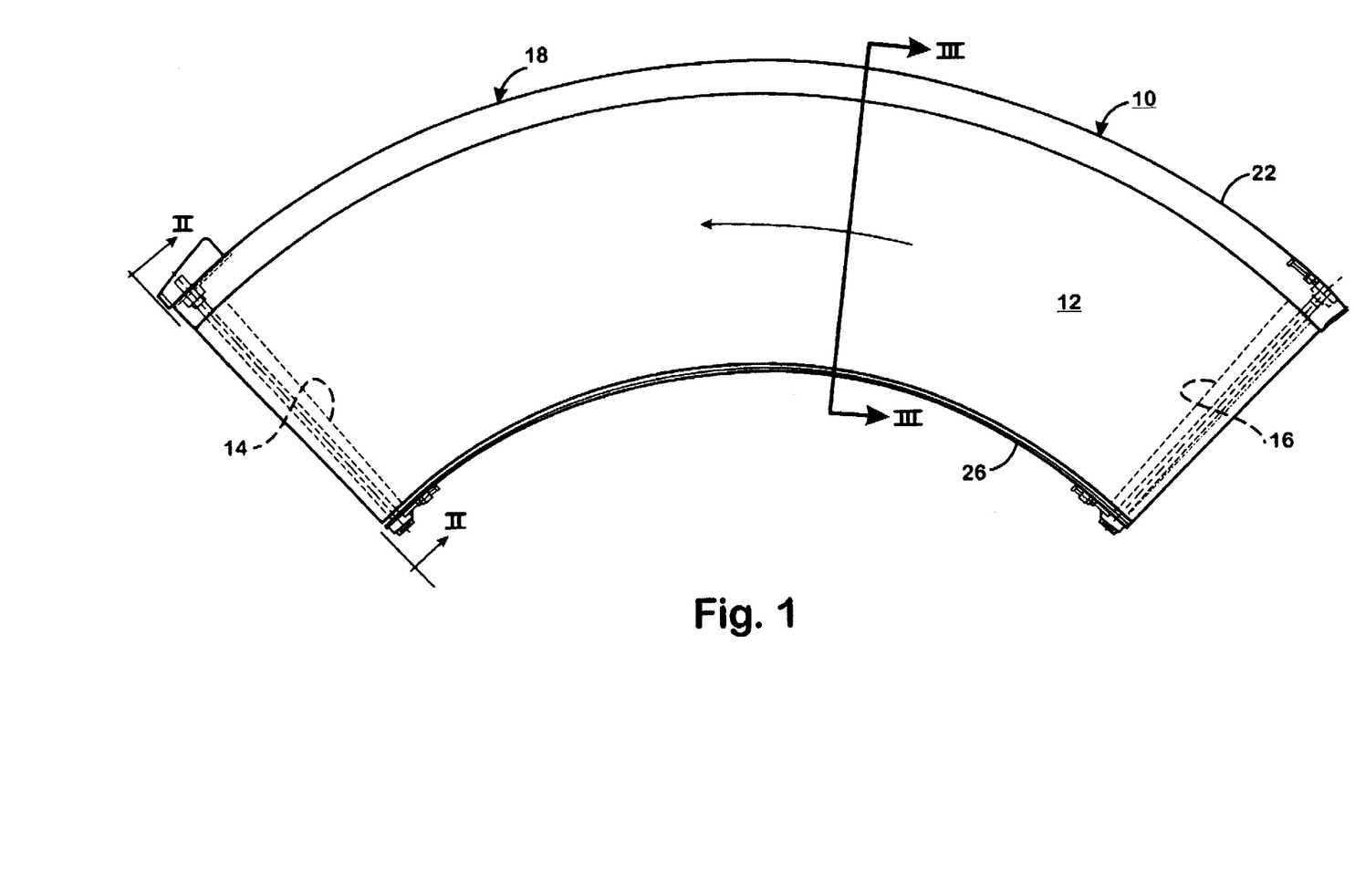
FIG. 1 is a top plan view of a belt turn conveyor, according to the invention.
Figure 2:
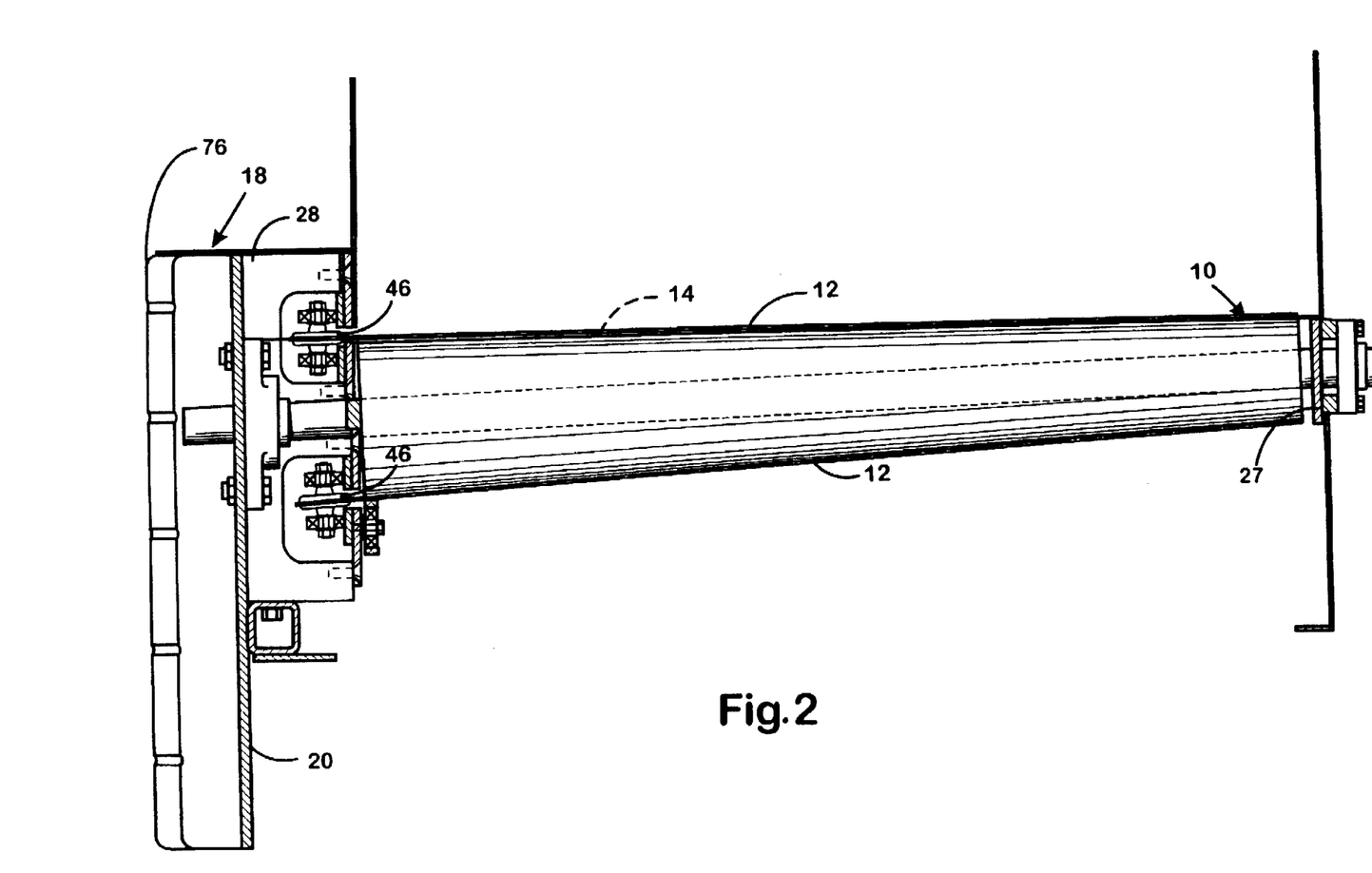
FIG. 2 is an end elevation in the direction II—II in FIG. 1.

Referring now specifically to the drawings and the illustrative embodiments depicted therein, a belt turn conveyor 10 includes an endless belt 12 driven by a driven pulley 14 and an idler pulley 16 (FIG. 1). As is conventional, endless belt 12 has a shorter inner length at an inner conveyor end 26 than an outer length at an outer conveyor end 22 and pulleys 14, 16 are tapered. Belt 12 and pulleys 14, 16 are supported by a support frame 18.

Support frame 18 includes a vertical support 20 at outer end 22 of the belt turn and a cantilevered support 24 for supporting inner end 26 of the conveyor. Because inner end 26 is cantilevered from vertical support 20, minimal vertical support is required for inner end 26. As such, belt 12 may be removed by sliding the belt toward the right as viewed in FIGS. 2–6 to remove and replace the belt.

Figures 3, 5:
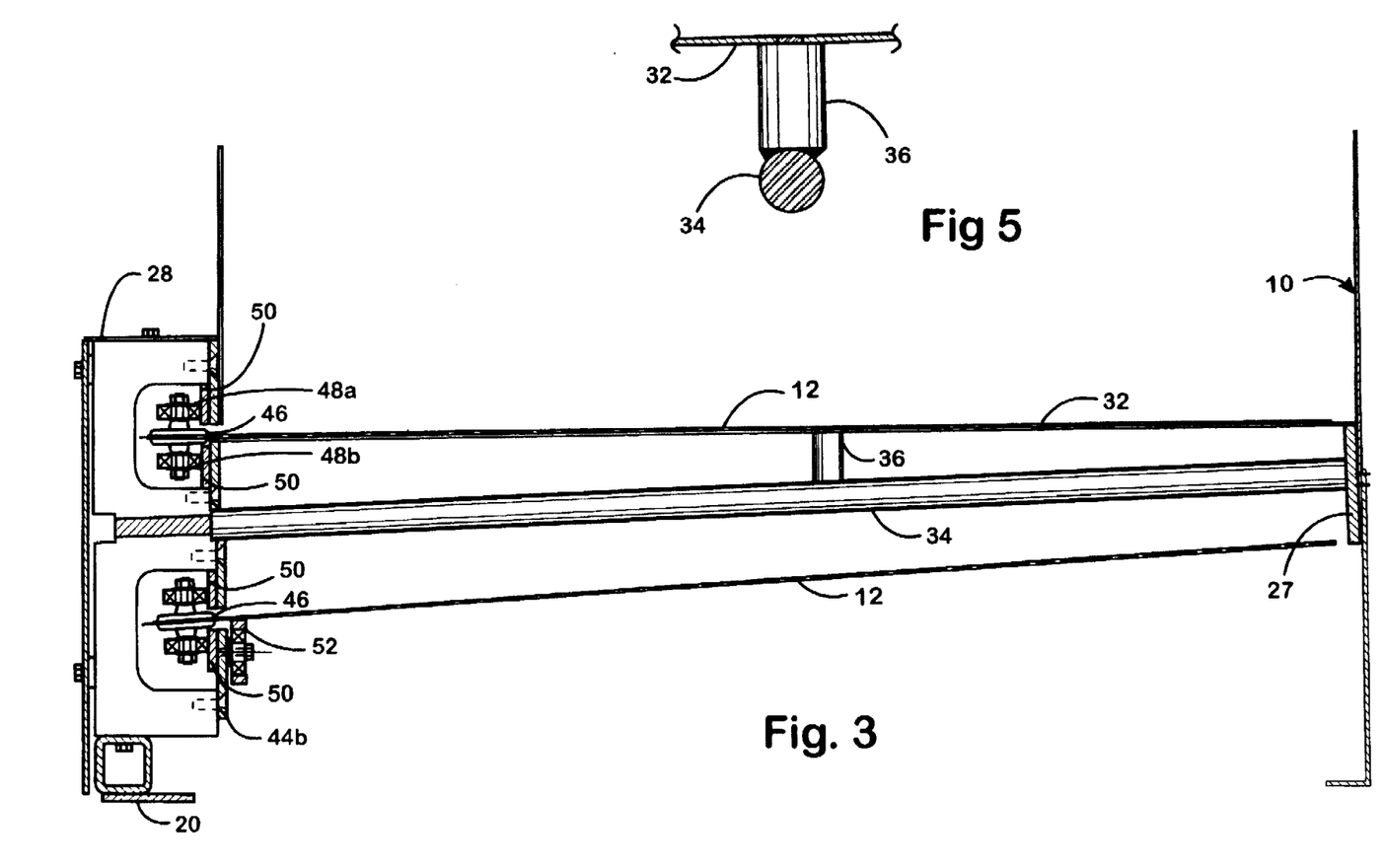
FIG. 3 is a sectional view taken along the lines III—III in FIG. 1.
FIG. 5 is a sectional view taken along the lines V—V in FIG. 4.
Figure 4:
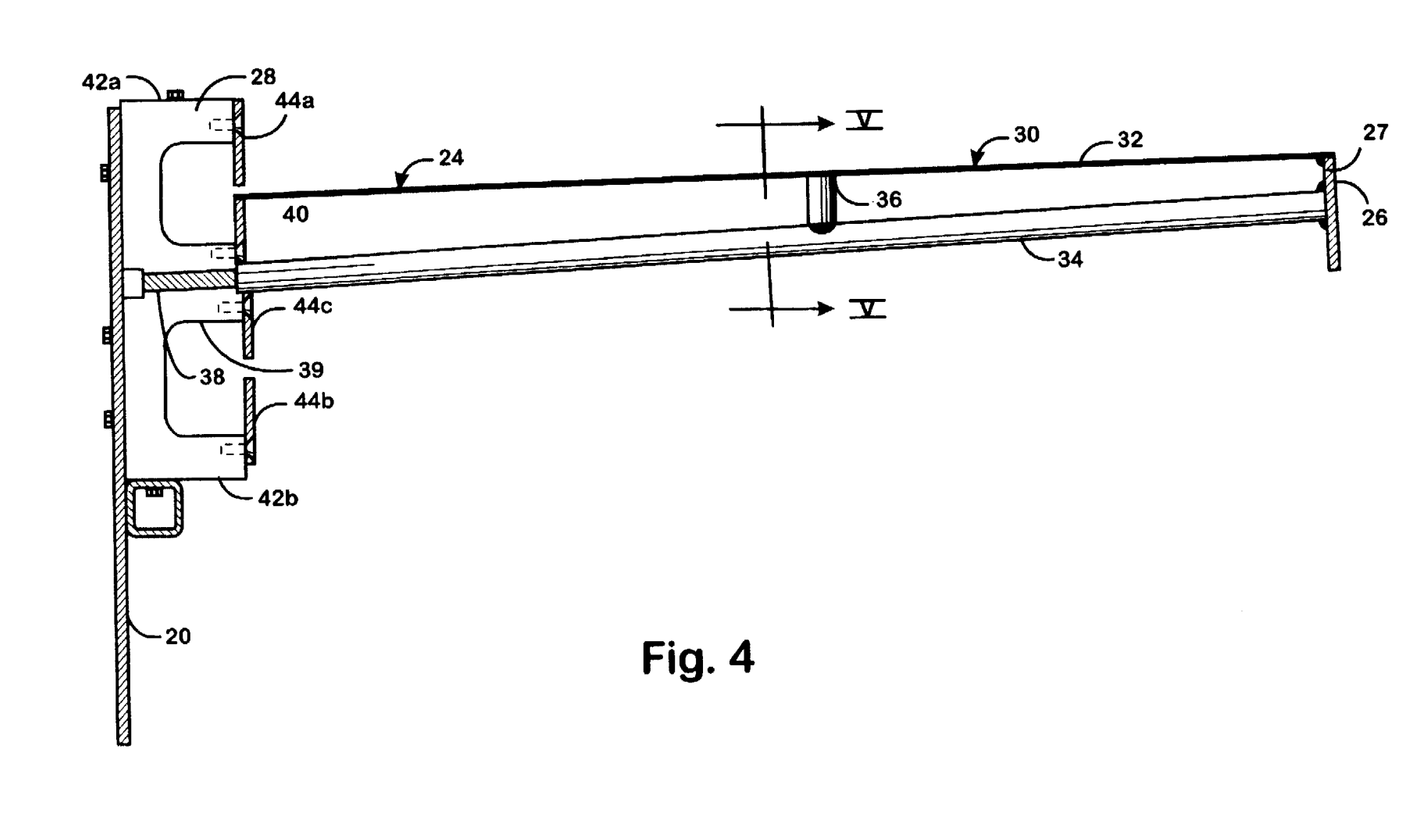
FIG. 4 is the same view as FIG. 3 with the belt removed.

Cantilever support 24 includes a support bracket 28 mounted to vertical support 20 and a truss member 30 cantilevered from support bracket 28 (FIGS. 3–5). Truss 30 is made up of a planar support member 32 which extends under substantially the entire upper surface of endless belt 12. Truss 30 additionally includes a plurality of elongated members 34, which in the illustrated embodiment are steel rods, which are spaced below planar surface 32 and interconnected with the planar surface by struts 36. Each strut 36 is welded to a steel rod 34 and to planar support 32 (FIG. 5). Ends of planar support 32 and each steel rod 34 opposite support bracket 28 are welded to plate 27 at inner conveyor end 26. Each steel rod 34 is additionally rigidly affixed to support bracket 28 by a fastener (not shown) extending through an opening 38 in bracket 28. Planar support 32 is rigidly attached to bracket 28 through a plate 40. As will be apparent to those skilled in the art, the rigid interconnection of elongated members 34 and planar support 32 at support bracket 28 at one end and to plate 27 at the opposite end, in combination with a rigid interconnection at strut 36, provides a rigid truss which is capable of supporting a substantial vertical load and thereby is capable of providing cantilever support to endless belt 12 even at inner end 26.

Additional rigidity could be provided by using more than one strut 36 for each steel rod 34.

Support bracket 28 includes a central support portion 39 which provides cantilevered support for truss 30 and outer portions 42a and 42b. A plate 44a attached to end portion 42a, a plate 44b attached to end portion 42b, and a second plate 44c attached to central support portion 39 provide wheel guides which extend the entire length of outer end 22 of support frame 18. A wheel assembly 46 is attached at even spacing along the outer end of endless belt 12. Each assembly includes a first support wheel 48a and a second support wheel 48b on an opposite side of the belt. Liner surfaces 50 are provided along the surface of plates 40 and 44a -44c, which are engaged by wheels 48a, 44b. A vertical support wheel 52 mounted to plate 44b provides vertical support for the lower surface of belt 12.

In order to replace belt 12, plates 44a, 44b are removed, which allows the wheel assemblies 46 to be separated from the support brackets 28 so that the belt may be slid to the right as viewed in FIGS. 2–6 and thereby removed from the belt turn conveyor for replacement. The same procedure is followed in reverse in order to apply a new belt to the assembly.

Figure 6:
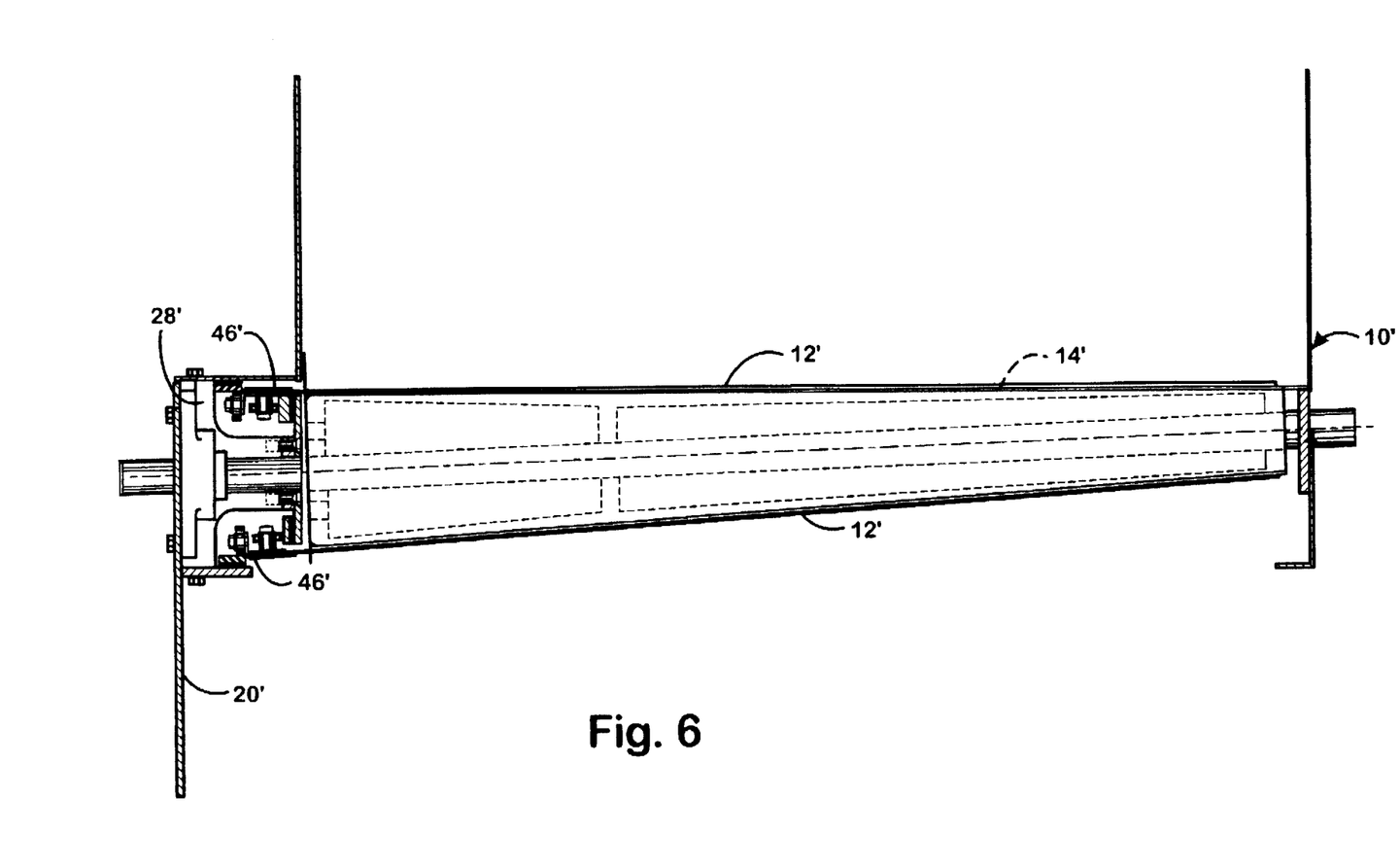
FIG. 6 is the same view as FIG. 2 of an alternative embodiment of the invention.
Figure 7:
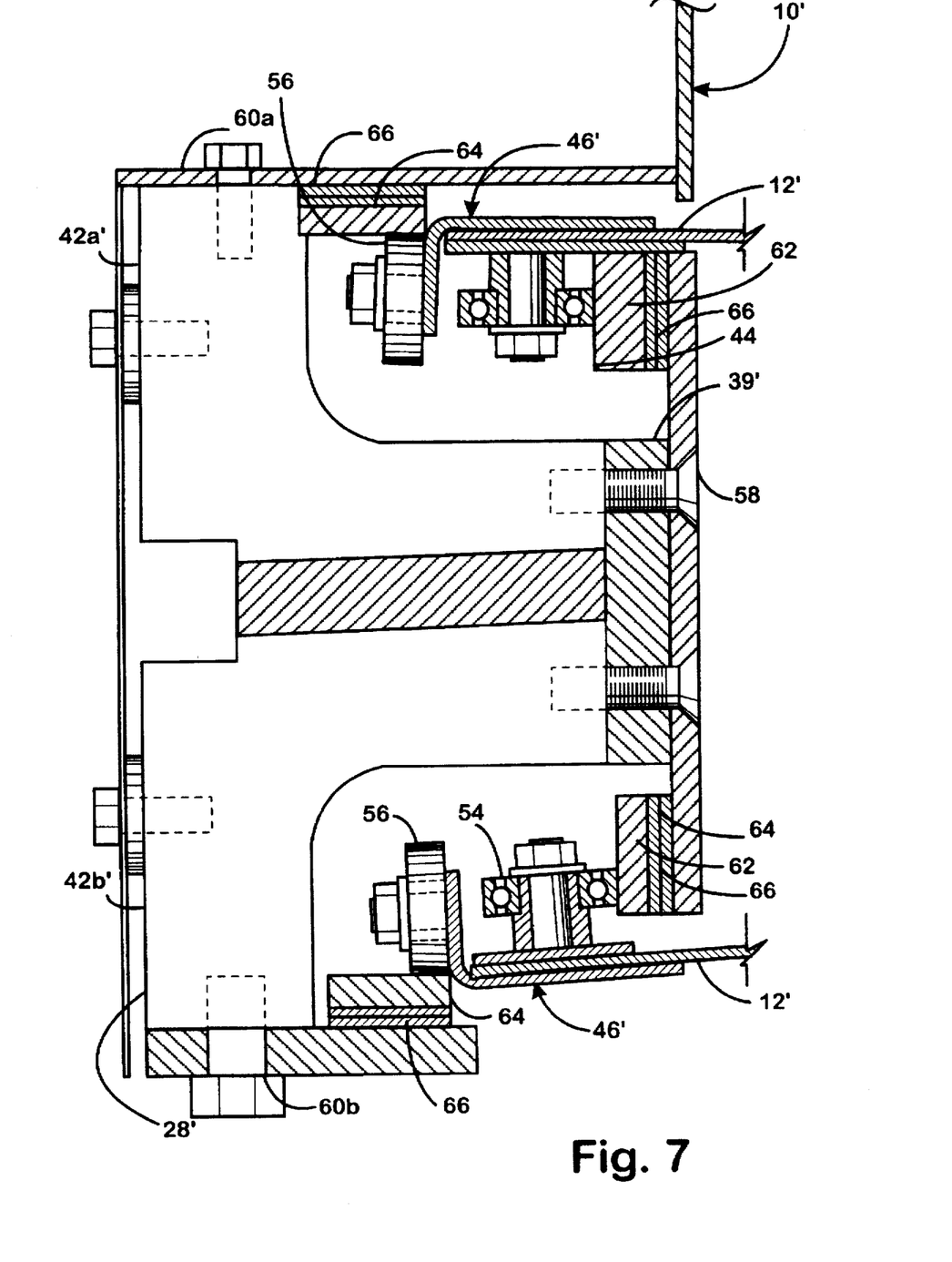
FIG. 7 is an enlarged view similar to FIG. 3 of an alternative embodiment of the invention concentrating on the radial support for the belt.

In an alternative embodiment, belt turn conveyor 10' includes an endless belt 12' having wheel assemblies 46' at outer ends thereof (FIGS. 6 and 7). Each wheel assembly 46' includes a lateral support wheel 54 and a vertical support wheel 56. Belt turn conveyor 10' includes a plurality of support brackets 28', each of which are supported by a vertical support 20'. Each support bracket 28' includes a central support portion 39', which supports a truss 30' (not shown in FIGS. 6–8) and end portions 42a ', 42b '. A plate 58 attached to central support portion 39' provides a wheel guide for wheels 54. A plate 60a attached to end portion 42a ' and a plate 60b attached to end portion 42b ' provide wheel guides for wheels 56. A pair of liners 62 are affixed to plate 58 in order to provide a running surface for wheels 54. A pair of liners 64 attached to plates 60a, 60b provide running surfaces for wheels 56. In the illustrated embodiment, wheels 54 include outer tires made from a polymeric material such as urethane. Liners 62 are made from a metal, such as steel. This provides a plastic-to-metal interface which reduces noise. Conversely, wheels 56 have outer tires made from a metal, such as steel, and liners 64 are manufactured from a polymer, such as urethane. This also provides a plastic-to-metal interface which reduces noise.

Liners 62, 64 are replaceable. Liners 62, 64 are mounted to their respective plates 58, 60a, 60b by a hook and loop fabric fastener 66, such as the type marketed under the brand Velcro™. This allows for rapid replacement of liners 62, 64.

Figure 8:
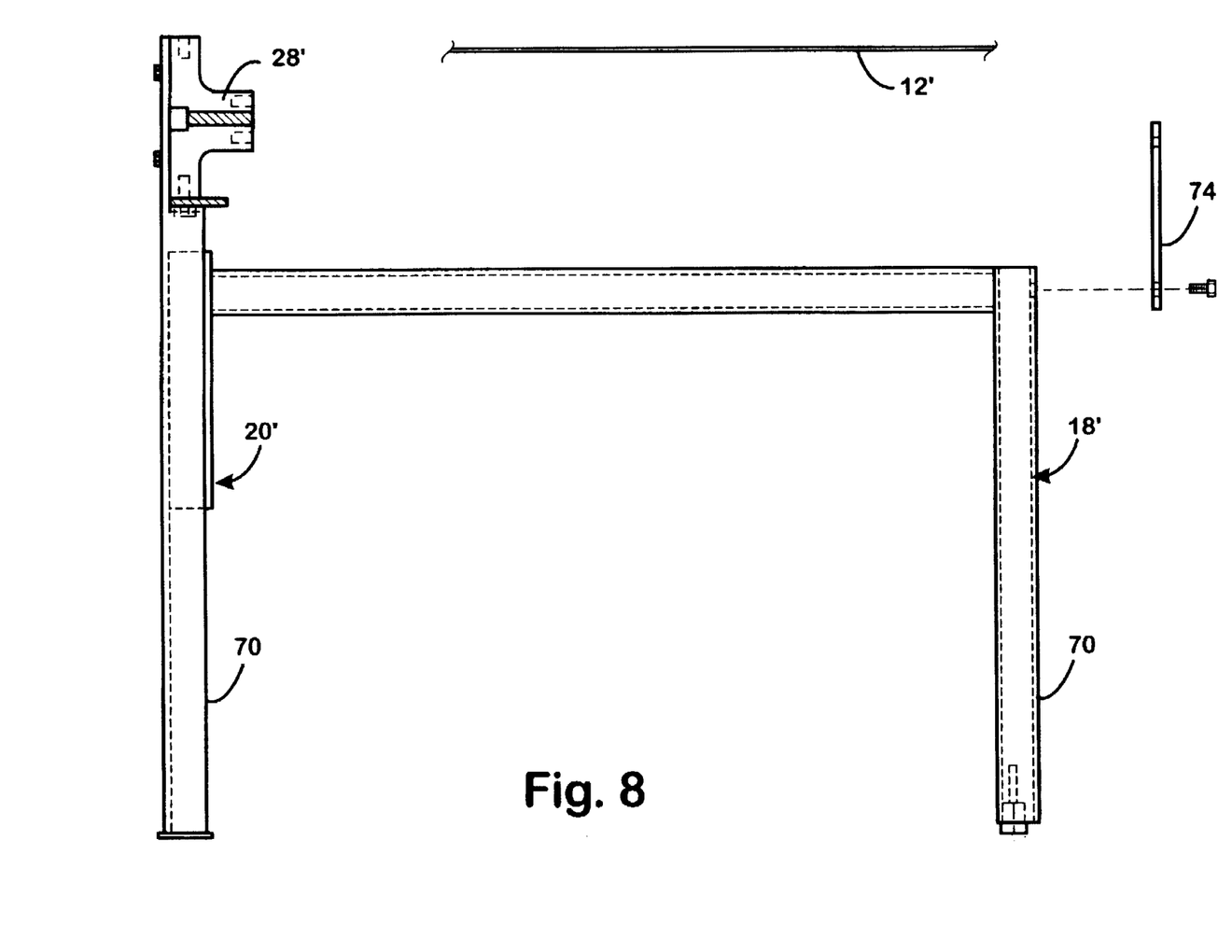
FIG. 8 is an end elevation of an alternative embodiment of a vertical support.

In order to provide stable support to support brackets 28', belt turn conveyor 10' includes a support frame 18' having vertical supports 20' configured as illustrated in FIG. 8. Each vertical support 20' includes a pair of vertical legs 70 interconnected by a horizontal support 72. Legs 70 extend upwardly in order to mount support bracket 28'. Although vertical support 20' has a wide support base, the support for endless belt 12' is cantilevered from the vertical support through support brackets 28'. A dampening member 74 attaches an outer end of truss 30' (not shown) in order to provide vibration dampening to the truss. However, dampening member 74 does not provide any significant load support to truss 30'. In this manner, dampening member 74 is readily removable from the truss in order to provide easy removal of endless belt 12'. Alternatively, each vertical support 20' could include one L-shaped leg having a cantilevered horizontal ground-engaging portion. In addition to being floor-supported, the vertical support may be attached to a wall or beam or suspended from the ceiling or the like.

Figure 9:
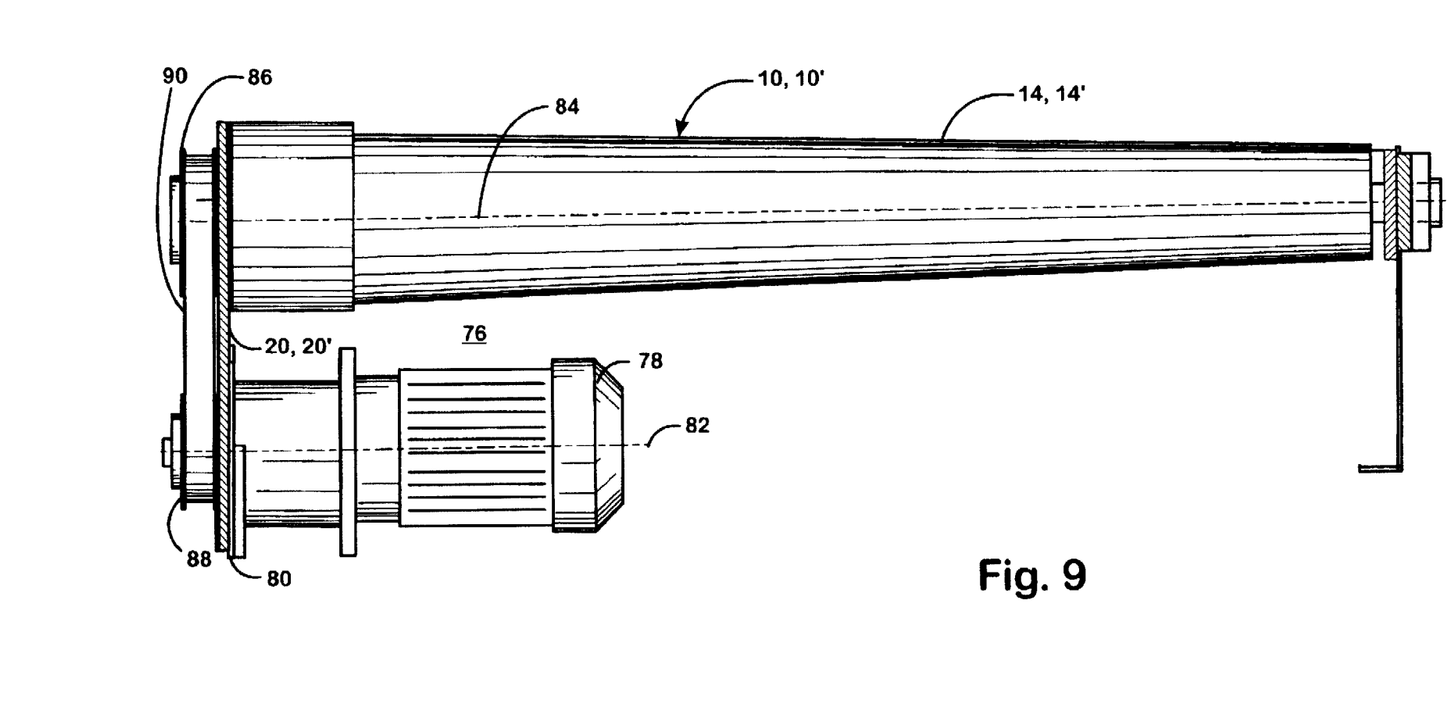
FIG. 9 is an end elevation of a drive assembly according to the invention.

Belt turn conveyor 10, 10' includes a drive assembly 76 (FIG. 9). Drive assembly 76 includes a motor assembly 78 attached to vertical support 20, 20' through a beveled plate 80. Beveled plate 80 aligns rotation axis 82 of motor assembly 78 in parallel with rotation axis 84 of driven pulley 14, 14'. This provides an alignment of a sheave 86 on pulley 14, 14' with a sheave 88 driven by motor assembly 78 in order to avoid stress on a belt 90 which couples pulleys 86, 88. Furthermore, beveled spacer 80 provides alignment between axes 82, 84 in a vertical plane running laterally across the conveyor as well as the vertical plane through belt 90. This solves the difficulty of compound angles which are present because of the curved nature support frame 18 as well as the inclined nature of the rotational axis of driven pulley 14, 14'. Beveled spacer 80 includes an opening (not shown) which receives the shaft of motor assembly 78 to further assist in proper positioning of the spacer. Thus, it is seen that proper alignment between pulleys 86, 88 is maintained without the necessity for any adjustment device which requires manual field adjustment.

Although the invention is described as it pertains to a belt turn conveyor, it may be applied to other belt conveyors including straight sections of belt transport conveyors and belt accumulation conveyors.

Changes and modifications in the specifically described embodiments can be carried out without departing from the principles of the invention which is intended to be limited only by the scope of the appended claims, as interpreted according to the principles of patent law including the doctrine of equivalents.

The embodiments of the invention in which an exclusive property or privilege is claimed are defined as follows:

1. A belt turn conveyor, comprising:
   a vertical support;
   a lateral support cantilevered from said vertical support, wherein said lateral support includes at least one removable wheel guide surface; and
   an endless belt riding on said lateral support wherein said endless belt includes wheels engaging said guide surface, wherein said belt can be removed without disassembling said vertical support.

2. The belt turn conveyor in claim 1 wherein said lateral support includes a planar bed extending below the upper surface of said belt.

3. The belt turn conveyor in claim 1 wherein said lateral support includes a plurality of members welded together as a truss.

4. The belt turn conveyor in claim wherein said lateral support surface is connected with said vertical support by a T-shaped bracket.

5. The belt turn conveyor in claim 4 wherein said at least one wheel guide surface includes at least one vertical surface for resisting lateral movement of said belt.

6. The belt turn conveyor in claim 5 wherein said at least one wheel guide surface includes at least one horizontal surface for resisting vertical movement of said belt.

7. The belt turn conveyor in claim 1 wherein said at least one wheel guide surface includes a replaceable liner.

8. The belt turn conveyor in claim 7 wherein said replaceable liner is attached to said wheel guide surface using hook and loop fasteners.

9. The belt turn conveyor in claim 8 wherein at least one of said wheels on said belt have polymeric tires and wherein said liner has a metal surface engaging said one of said wheels.

10. The belt turn conveyor in claim 8 including wheels on said belt having metal tires and wherein said liner has a polymeric surface engaging said wheels.

11. The belt turn conveyor in claim 1 including an elongated drive pulley which rotates about a first axis frictionally engaging said belt in order to drive said belt and a motor assembly which rotates about a second axis for rotating said drive pulley, wherein said first and second axes are parallel.

12. The belt turn conveyor in claim 11 wherein said drive pulley is tapered and said first axis is inclined and wherein said motor assembly is mounted to said vertical support with a beveled spacer.

13. The belt turn conveyor of claim 1 wherein said at least one wheel guide surface includes at least one vertical surface for resisting lateral movement of said belt.

14. A method of removing and installing an endless belt of a belt turn conveyor, including:
 providing a belt turn conveyor frame having a vertical support extending to ground and a lateral support cantilevered from said vertical support;
 slipping an endless belt over an end of said lateral support opposite said vertical support, wherein said belt can be removed without disassembling said vertical support; and,
 wherein said frame includes a plurality of vertical wheel guide surfaces and the endless belt includes a plurality of wheel assemblies spaced along an edge of said belt and wherein said slipping includes removing said wheel guide surfaces.

15. The method of claim 14 wherein said vertical support includes a pair of laterally space support legs, one of said legs having a portion vertically below said end of said lateral support and said providing includes providing a vibration-dampening member between said portion and said end of said lateral support.

16. The method of claim 15 wherein said slipping includes disconnecting said vibration-dampening member from at least one of said portion and said end of said lateral support.

17. A belt turn conveyor, comprising:
 a vertical support;
 a truss member cantilevered from said vertical support and including a planar member, at least one lateral member spaced below said planar member and at least one strut joining said lateral member with said planar member; and
 an endless belt supported at an upper surface by said planar member.

18. The belt turn conveyor in claim 17 including a rigid support bracket including an enlarged central support portion mounting said truss member to said vertical support.

19. The belt turn conveyor in claim 18 wherein said support bracket includes vertically outer portions and a plurality of wheel-engaging plates mounted to said outer portions and to said central support portion and wherein said belt includes a plurality of wheel assemblies engaging said plates.

20. The belt turn conveyor in claim 19 including liner members removably attached to said wheel-engaging plates.

21. The belt turn conveyor in claim 20 including hook and loop fasteners attaching said liner members to said wheel engaging plates.

22. The belt turn conveyor in claim 19 wherein said support bracket is E-shaped.

23. The belt turn conveyor in claim 19 wherein said support bracket is T-shaped.

24. The belt turn conveyor in claim 17 wherein said vertical support is configured to be supported by a floor.

25. The belt turn conveyor in claim 24 wherein said vertical support includes a pair of laterally spaced legs engaging the floor.

26. The belt turn conveyor in claim 25 wherein one of said legs includes a portion vertically below an end of said truss member opposite a portion of said truss cantilevered from said vertical support and further including a vibration-dampening member between said leg portion said truss end.

27. A belt turn conveyor comprising:
 a vertical support;
 a lateral support cantilevered from said vertical support wherein said lateral support includes a plurality of members welded together as a truss; and
 an endless belt riding on said lateral support, wherein said belt can be removed without disassembling said vertical support;
 wherein said truss includes a planar bed extending below the upper surface of said belt, at least one elongated member spaced below said bed and at least one vertical member rigidly connecting said elongated member and said bed.

28. The belt turn conveyor in claim 27 wherein said lateral support includes a rigid support bracket connected with said vertical support for supporting said strut and at least one wheel guide surface attached to said bracket and wherein said endless belt includes wheel engaging said guide surface.

29. The belt turn conveyor in claim 28 wherein said bracket is E-shaped.

30. The belt turn conveyor in claim 29 wherein said at least one wheel guide surface includes at least one vertical surface for resisting lateral movement of said belt.

* * * * *

UNITED STATES PATENT AND TRADEMARK OFFICE
CERTIFICATE OF CORRECTION

PATENT NO. : 5,722,531
DATED : March 3, 1998
INVENTOR(S) : Mariusz Zimny, John Krznarich and Allan Ewing It is certified that error appears in the above-identified patent and that said Letters Patent is hereby corrected as shown below:

Column 1, line 18:
"molted" should be --mounted--.

Column 3, line 14:
"44b" should be --48b--.

Column 4, line 50, claim 4:
After "claim" insert --1--.

Column 6, line 27, claim 27:
After "conveyor" insert --,--.

Signed and Sealed this

Twenty-second Day of June, 1999

Attest:

Q. TODD DICKINSON

Attesting Officer      Acting Commissioner of Patents and Trademarks